US012744998B2

(12) United States Patent
Nitta et al.

(10) Patent No.: US 12,744,998 B2
(45) Date of Patent: Sep. 22, 2026

(54) MICROSCOPE SYSTEM AND DATA PROCESSING METHOD

(71) Applicant: K.K. CYBO, Tokyo (JP)

(72) Inventors: Nao Nitta, Tokyo (JP); Takeaki Sugimura, Yokohama (JP); Akira Arafune, Tokyo (JP)

(73) Assignee: K.K. CYBO, Tokyo (JP)

(*) Notice: Subject to any disclaimer, the term of this patent is extended or adjusted under 35 U.S.C. 154(b) by 174 days.

(21) Appl. No.: 18/716,857

(22) PCT Filed: May 8, 2023

(86) PCT No.: PCT/JP2023/017241

§ 371 (c)(1),
(2) Date: Jun. 5, 2024

(87) PCT Pub. No.: WO2023/233922

PCT Pub. Date: Dec. 7, 2023

(65) Prior Publication Data

US 2026/0122346 A1 Apr. 30, 2026

(30) Foreign Application Priority Data

Jun. 3, 2022 (JP) ................................ 2022-090629
Aug. 9, 2022 (JP) ................................ 2022-127011
Oct. 4, 2022 (JP) ................................ 2022-159896

(51) Int. Cl.
*H04N 23/66* (2023.01)
*G06T 9/00* (2006.01)
(Continued)

(52) U.S. Cl.
CPC ............... *H04N 23/66* (2023.01); *G06T 9/00* (2013.01); *H04N 23/55* (2023.01); *H04N 23/69* (2023.01)

(58) Field of Classification Search
CPC ........ H04N 23/66; H04N 23/55; H04N 23/69; G06T 9/00
See application file for complete search history.

(56) References Cited

U.S. PATENT DOCUMENTS 6,477,204 B1 * 11/2002 Fukushima ...... H04N 21/43072 375/E7.278
6,711,283 B1 3/2004 Soenksen
(Continued)

FOREIGN PATENT DOCUMENTS

EP 2 426 644 B1 10/2016
JP 2005-037902 A 2/2005
(Continued)

OTHER PUBLICATIONS

International Search Report for International Application No. PCT/JP2023017241 dated Jun. 6, 2023, Japan, 2 pages.
(Continued)

*Primary Examiner* — Gims S Philippe
(74) *Attorney, Agent, or Firm* — United IP Counselors, LLC

(57) ABSTRACT

A microscope system includes: a microscope acquiring an image of a specimen on a focal plane; an imaging unit imaging the image acquired by the microscope; a focal plane moving mechanism moving the focal plane in an optical axis direction of the microscope; a compression unit compressing image data pieces of the images acquired by the imaging unit to generate compressed image data; and a control unit transmitting, to the focal plane moving mechanism, a focal plane control signal to move the focal plane to a predetermined focal coordinate, the control unit transmitting, to the imaging unit, a plurality of imaging timing signals specifying the timing of imaging the images, the control unit transmitting, to the compression unit, layer count data
(Continued)

indicating the number of the plurality of imaging timing signals.

14 Claims, 14 Drawing Sheets

(51) Int. Cl.
*H04N 23/55* (2023.01)
*H04N 23/69* (2023.01)

(56) References Cited

U.S. PATENT DOCUMENTS

| | | | | |
|---|---|---|---|---|
| 7,593,581 | B2 | 9/2009 | Hecht et al. | |
| 10,935,778 | B2 * | 3/2021 | Cramb | A61B 5/441 |
| 11,983,612 | B2 * | 5/2024 | Kuwamori | G06V 20/698 |
| 2003/0227673 | A1 * | 12/2003 | Nakagawa | G02B 21/365 359/368 |
| 2006/0239534 | A1 | 10/2006 | Sumida et al. | |
| 2009/0213214 | A1 * | 8/2009 | Yamada | G06T 7/0012 348/80 |
| 2011/0060766 | A1 * | 3/2011 | Ehlke | G16H 30/00 715/810 |
| 2012/0127297 | A1 * | 5/2012 | Baxi | G06V 20/695 382/173 |
| 2012/0212599 | A1 | 8/2012 | Murakami | |
| 2014/0015933 | A1 | 1/2014 | Sato et al. | |
| 2014/0023283 | A1 | 1/2014 | Liu et al. | |
| 2016/0231548 | A1 * | 8/2016 | Sabanayagam | G02B 21/362 |
| 2018/0259762 | A1 * | 9/2018 | Fujimoto | G01N 21/6428 |
| 2019/0052773 | A1 | 2/2019 | Hwang | |
| 2020/0372643 | A1 * | 11/2020 | Esposito | G06T 7/97 |

FOREIGN PATENT DOCUMENTS

| | | | |
|---|---|---|---|
| JP | 2007-011977 | A | 1/2007 |
| JP | 2008-090072 | A | 4/2008 |
| JP | 2012-173391 | A | 9/2012 |
| JP | 2012-209806 | A | 10/2012 |
| JP | 2014-029528 | A | 2/2014 |
| JP | 2015-082097 | A | 4/2015 |
| JP | 2022-028422 | A | 2/2022 |
| WO | 01/27678 | A1 | 4/2001 |

OTHER PUBLICATIONS

Digital Imaging and Communications in Medicine (DICOM) Supplement 145: Whole Slide Microscopic Image IOD and SOP Classes Prepared by: DICOM Standards Committee, Working Groups 26, Pathology Version 9: For WG-06 meeting Oct. 28, 2009.

Ewen David McAlpine, Liron Pantanowitzk, and Pamela M. Michelow. Challenges Developing Deep Learning Algorithms in Cytology. ActaCytologica 2021 (65) 301-309 (DOI: 10.1159/000510991).

Extended European Search Report issued in corresponding European Application No. 23815683.0 dated May 6, 2026, 10 pages.

Rojo, Marcial Garcia et al.; "Critical Comparison of 31 Commercially Available Digital Slide Systems in Pathology," International Journal of Surgical Pathology, Churchill Livingstone, Naperville, IL, US, vol. 14, No. 4, Oct. 1, 2006 (Oct. 1, 2006), pp. 285-305, XP002664839, ISSN: 1066-8969, DOI: 10.1177/1066896906292274 (Discussed in NPL cite 1).

* cited by examiner

22
S
10
Y
X
Z
20
STAGE MOVING MECHANISM
42
FOCAL PLANE MOVING MECHANISM
40
CONTROL UNIT
50
30
IMAGE BUFFER
55
COMPRESSION UNIT
60
STORAGE UNIT
70
TRANSMISSION UNIT
80

PASTING

MICROSCOPE SYSTEM AND DATA PROCESSING METHOD

CROSS-REFERENCE TO RELATED APPLICATIONS

This application is a National Stage Entry application of PCT International Application No. PCT/JP2023/017241, filed on May 8, 2023, which claims the priority benefit of Japanese Patent Application No. 2022-090629, filed on Jun. 3, 2022, Japanese Patent Application No. 2022-127011, filed on Aug. 9, 2022, and Japanese Patent Application No. 2022-159896, filed on Oct. 4, 2022, the entire contents of which are hereby incorporated by reference.

BACKGROUND

1. Technical Field

The present invention relates to a microscope system and a data processing method.

2. Description of the Background

Microscopic examination has found wide applications, including diagnosing cancer and infectious diseases and testing food. To overcome the shortage of human resources for examination and to improve the examination quality, there are attempts to digitize microscopic images for efficient examination using artificial intelligence or to transfer the image data to remote locations for remote examination.

To record a microscopically observed image of a minute object, such as a cell, as digital data, the user attaches a digital camera to a microscope and captures a microscopic image. The obtained digital image data is then written directly to a recording device on the camera or transferred to a computer connected to the digital camera. The digitization of microscopic images is particularly active for the purpose of applying artificial intelligence technology to microscopic examination.

If the imaging object does not fit into the imageable field of view of the digital camera, the user moves the stage on which the specimen is placed and repeats the imaging process. Thus, a larger area than the field of view of the digital camera can be recorded as digital data. In addition, by repeating the imaging while changing the distance between the object and the objective, the stacked images, including the depth direction information of the object, can be recorded. For example, a whole slide scanner that digitizes a histopathology specimen over the entire slide has been put into practical use (Non Patent Literature 1: Digital Imaging and Communications in Medicine (DICOM) Supplement 145: Whole Slide Microscopic Image IOD and SOP Classes Prepared by: DICOM Standards Committee, Working Groups 26, Pathology VERSION 9: For WG-06 meeting 2009 Oct. 28, hereinafter referred to as Non Patent Literature 1).

For example, a whole slide scanner digitizes a 15 mm square area at a resolution of 250 nm per pixel. This provides a huge digital image of 60,000 pixels×60,000 pixels. Three-dimensional imaging of 30 layers in the depth direction produces huge digital images of 60,000 pixels×60,000 pixels×30 layers. Such huge digital images are difficult to handle because they require a large amount of storage space and communication bandwidth when stored or transferred. To cope with this problem, huge digital images are sometimes compressed and recorded.

Lossless or lossy compression such as LZW, JPEG, and JPEG 2000 is commonly used for compression. Typically, LZW can compress data by a factor of about 3 to 5. JPEG 2000 can compress data by a factor of about 15 to 20. For example, JPEG 2000 can compress specimen data from about 15 GB to about 300 MB (Non Patent Literature 1).

JP 2007-11977 A (hereinafter referred to as Patent Literature 1) and JP 2014-29528 A (hereinafter referred to as Patent Literature 2) propose exemplary methods of compressing Z-layer microscopic images. However, the methods of Patent Literature 1 and Patent Literature 2 have not been widely used because of their limited compression effect and the processing time and cost required for encoding and decoding.

On the other hand, since MPEG-2, various compression techniques such as H.264/AVC, H.265/HEVC, AV1 have been developed to compress videos, including movies. These techniques are widely used as means for transferring and recording large amounts of data, such as Internet streaming of movies.

When acquiring high-resolution three-dimensional images through microscopic imaging, the handling of huge amounts of data becomes an issue. For example, microscopic examinations such as cytological diagnosis and chromosome examination using the FISH (fluorescence in situ hybridization) method require three-dimensional imaging of specimens. Since cell clusters are arranged in three dimensions in a specimen for cytological diagnosis, the specimen must be digitized in three dimensions. Three-dimensional digitization of the whole specimen on a slide using a whole slide scanner results in a further increased data volume. Similarly, the FISH method assesses the arrangement and number of fluorescent probes bound to chromosomes. Because the fluorescent probes are arranged in three dimensions in the nucleus, three-dimensional imaging is required. When data is acquired for a large number of cells, the volume of data becomes enormous.

In addition, the amount of data is enormous when imaging cell clusters such as spheroids and organoids in large quantities or when imaging their changes over time. This requires investments such as storage expansion for data archiving. It also increases the waiting time for data transfer and recording. Therefore, the digitization of three-dimensional microscopic images is only implemented in limited cases and has not been widely used in practical microscopic examination (Ewen David McAlpine, Liron Pantanowitzk, and Pamela M. Michelow. Challenges Developing Deep Learning Algorithms in Cytology. Acta Cytologica 2021 (65) 301-309 (DOI: 10.1159/000510991) hereinafter referred to as Non Patent Literature 2).

Applying data compression methods for two-dimensional images, such as JPEG and JPEG 2000, to each two-dimensional layer in a three-dimensional image does not provide sufficient compression efficiency for a three-dimensional whole slide image. Although JPEG 2000 has relatively high compression performance, it is often not used because not every computer supports it. In addition, advanced compression techniques place a heavy burden on computers. The computation time required for compression and restoration is long and impractical.

As an alternative to a three-dimensional image, an attempt has been made to synthesize and record a two-dimensional image by superimposing two-dimensional images of selected in-focus portions of a three-dimensional image. However, when this method is applied to cytological diagnosis, images of many cells are superimposed at the same location in a cell cluster in which many cells are stacked.

This makes it difficult to see the detailed structure of the inside of the cell, such as the structure of the cell nucleus, and makes it difficult to make an accurate judgment. Furthermore, in cytological diagnosis, it is necessary to observe the three-dimensional information to identify structural deformations, abnormalities in the arrangement of multiple cells. The methods of compressing the images into a two-dimensional image are not suitable for this purpose.

BRIEF SUMMARY

An object of the present invention is to provide a microscope system and a data processing method that compress three-dimensional microscopic images at a higher compression ratio than conventional ones while retaining three-dimensional image information, thereby facilitating data storage and transfer.

A first aspect of the present invention provides a microscope system including:

- a microscope configured to acquire an image of a specimen on a focal plane;
- an imaging unit configured to image the image acquired by the microscope;
- a focal plane moving mechanism configured to move the focal plane in an optical axis direction of the microscope;
- a compression unit configured to compress image data pieces of a plurality of the images acquired by the imaging unit to generate compressed image data; and
- a control unit configured to
  - transmit, to the focal plane moving mechanism, a focal plane control signal to move the focal plane to a predetermined focal coordinate,
  - transmit, to the imaging unit, a plurality of imaging timing signals specifying timing of imaging a plurality of the images, and
  - transmit, to the compression unit, layer count data indicating the number of the plurality of imaging timing signals.

A second aspect of the present invention provides a data processing method including:

- forming, in an imaging unit by a microscope, an image of a specimen on a focal plane;
- moving the focal plane to a predetermined focal coordinate along an optical axis direction of the microscope;
- imaging the image by the imaging unit based on an imaging timing signal;
- transmitting, to a compression unit, layer count data indicating the number of the imaging timing signal; and
- compressing, by the compression unit, image data pieces of the images imaged by the imaging unit to generate compressed image data.

A third aspect of the present invention provides a microscope system including:

- a microscope configured to acquire an image of a specimen on a focal plane;
- an imaging unit configured to image the image acquired by the microscope;
- a focal plane moving mechanism configured to move the focal plane in an optical axis direction of the microscope;
- a storage unit configured to store the image captured by the imaging unit; and
- a control unit configured to
  - transmit, to the focal plane moving mechanism, a focal plane control signal to move the focal plane to a predetermined focal coordinate,
  - transmit, to the imaging unit, a plurality of imaging timing signals specifying timing of imaging a plurality of the images in a single spot,
  - transmit, to the storage unit, an instruction of storing the plurality of images in the single spot, and
  - execute a focusing process that converts the plurality of images to a plurality of images in which inclination of the optical axis of the microscope to the specimen is corrected when an image focus differs by locations in the images in the single spot.

The control unit may perform deconvolution.

The control unit may adjust the luminance or color of the specimen.

The microscope system may further include a compression unit compressing image data pieces of a plurality of the images acquired by the imaging unit to generate compressed image data, and the control unit may execute a decoding process on the compressed image data.

The imaging unit may image the images in a plurality of spots, and the control unit may execute a tiling process.

The microscope system and data processing method of the present invention compress three-dimensional microscopic images at a higher compression ratio than conventional ones while retaining three-dimensional image information, thereby facilitating data storage and transfer.

DETAILED DESCRIPTION

Figure 1:
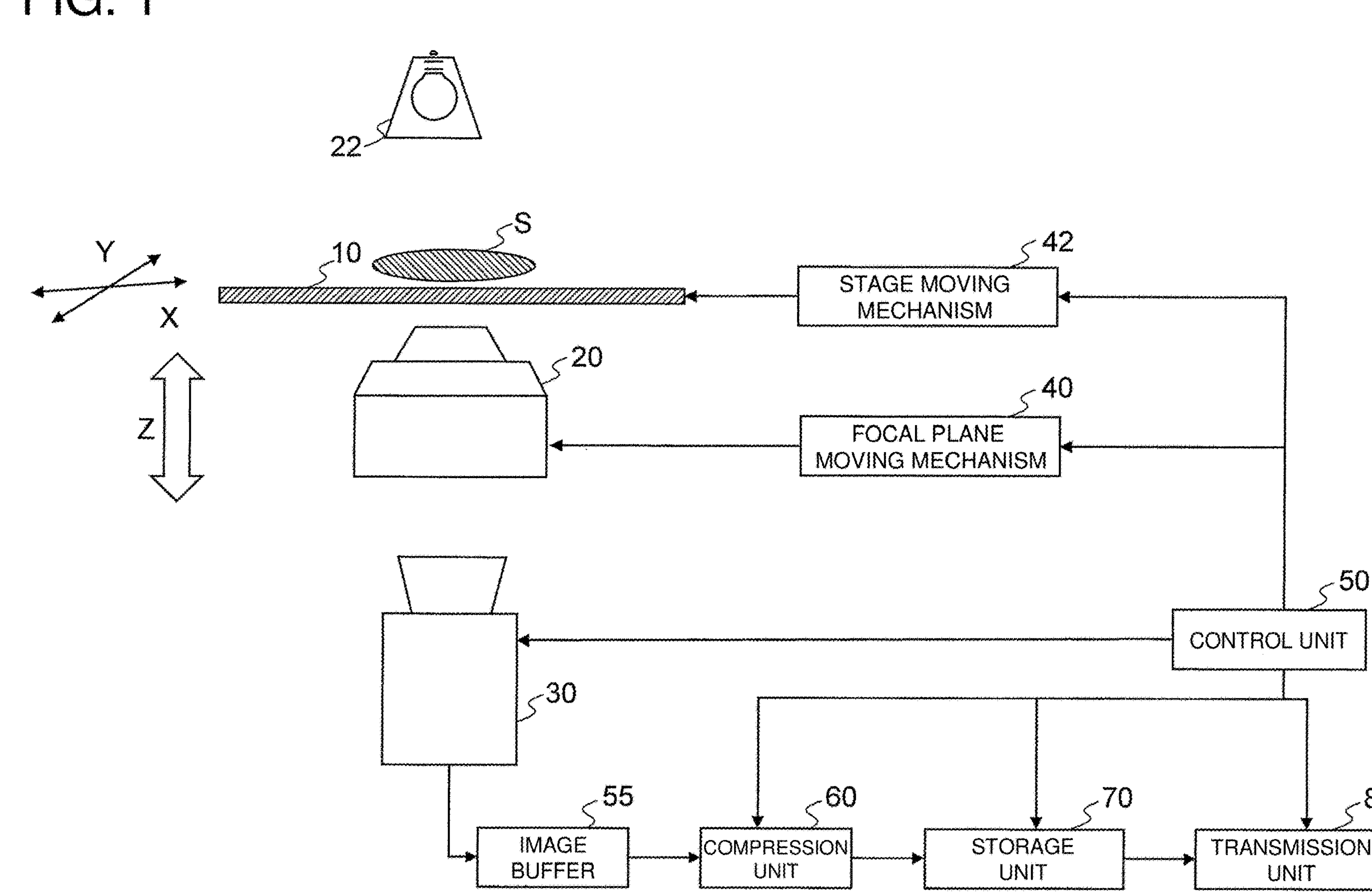
FIG. 1 is a schematic diagram of a data processing system according to an embodiment.

In the following, with reference to the drawings, a description will be given of a microscope system and a data processing method according to the present embodiment. FIG. 1 is a schematic diagram of a data processing system according to the present embodiment. The data processing system according to the present embodiment includes a microscope 20, an imaging unit 30, a focal plane moving mechanism 40, a control unit 50, and a compression unit 60. The data processing system may further include a stage 10, a stage moving mechanism 42, an image buffer 55, a storage unit 70, and a transmission unit 80. The data processing system may further include an illumination 22.

A specimen S, an object to be imaged, is placed on a stage 10. In the example shown in FIG. 1, the stage 10 is parallel to the XY plane.

The microscope 20 acquires an image of the specimen S in the focal plane. The microscope 20 has an optical system such as lenses.

The imaging unit 30 captures the image acquired by the microscope 20 according to an imaging timing signal. The imaging unit 30 is, for example, a digital camera.

The focal plane moving mechanism 40 moves the focal plane of the microscope 20 in the optical axis direction according to a focal plane control signal. The optical axis direction is perpendicular to the stage 10. In the example shown in FIG. 1, the optical axis direction is the Z direction. While the optical axis direction (Z direction) according to the present embodiment is the vertical direction, the optical axis direction is not limited to the vertical direction.

The stage moving mechanism 42 relatively moves the microscope 20 and the stage 10 in the perpendicular direction (XY direction) to the optical axis direction according to a stage-movement control signal.

The image buffer 55 may be disposed between the imaging unit 30 and the compression unit 60. The image buffer 55 may be configured as part of the output side of the imaging unit 30. Alternatively, the image buffer 55 may be configured as part of the input side of the compression unit 60. The image buffer 55 temporarily stores image data of a plurality of images captured by the imaging unit 30.

Another option is to configure a first image buffer 55 as part of the output side of the imaging unit 30 and a second image buffer 55 as part of the input side of the compression unit 60.

The compression unit 60 compresses the image data of a plurality of images captured by the imaging unit 30 or temporarily stored in the image buffer 55 to generate compressed image data. The compressed image data contains imaging position data.

The storage unit 70 stores the compressed image data generated by the compression unit 60.

The transmission unit 80 transmits the compressed image data externally.

The control unit 50 controls the imaging unit 30, the focal plane moving mechanism 40, the stage moving mechanism 42, the compression unit 60, the storage unit 70, and the transmission unit 80.

Specifically, the control unit 50 transmits, to the focal plane moving mechanism 40, a focal plane control signal to move the focal plane to a predetermined focal coordinate (Z coordinate). The control unit 50 transmits, to the imaging unit 30, an imaging timing signal specifying the timing of capturing an image. The control unit 50 transmits, to the compression unit 60, imaging position data containing the focal coordinate. The control unit 50 transmits, to the compression unit 60, layer count data indicating the number of the imaging timing signals. Here, the layer count data is data indicating the imaging count in the Z direction in one spot. The imaging count in the Z direction in one spot is set in advance.

The control unit 50 controls the compression unit 60 to properly receive and compress the image data captured by the imaging unit 30 in a proper format. The control unit 50 transmits, to the stage moving mechanism 42, a stage-movement control signal to relatively move the microscope 20 and the stage 10 in the perpendicular direction (XY direction) to the optical axis direction. At the timing when the focal coordinate attains the predetermined coordinate according to the focal plane control signal and the stage-movement control signal, the control unit 50 transmits an imaging timing signal to the imaging unit 30. Thus, the imaging unit 30 can capture an image of the specimen S at the desired focal plane.

The control unit 50 may transmit identification information of the specimen S to the compression unit 60. The control unit 50 may control the storage unit 70 to store the compressed image data. The control unit 50 may control the transmission unit 80 to transmit externally the compressed image data. The control unit 50 may add additional information, such as imaging conditions, to the compressed image data stored in the storage unit 70 or transmitted externally from the transmission unit 80.

Figure 2A:
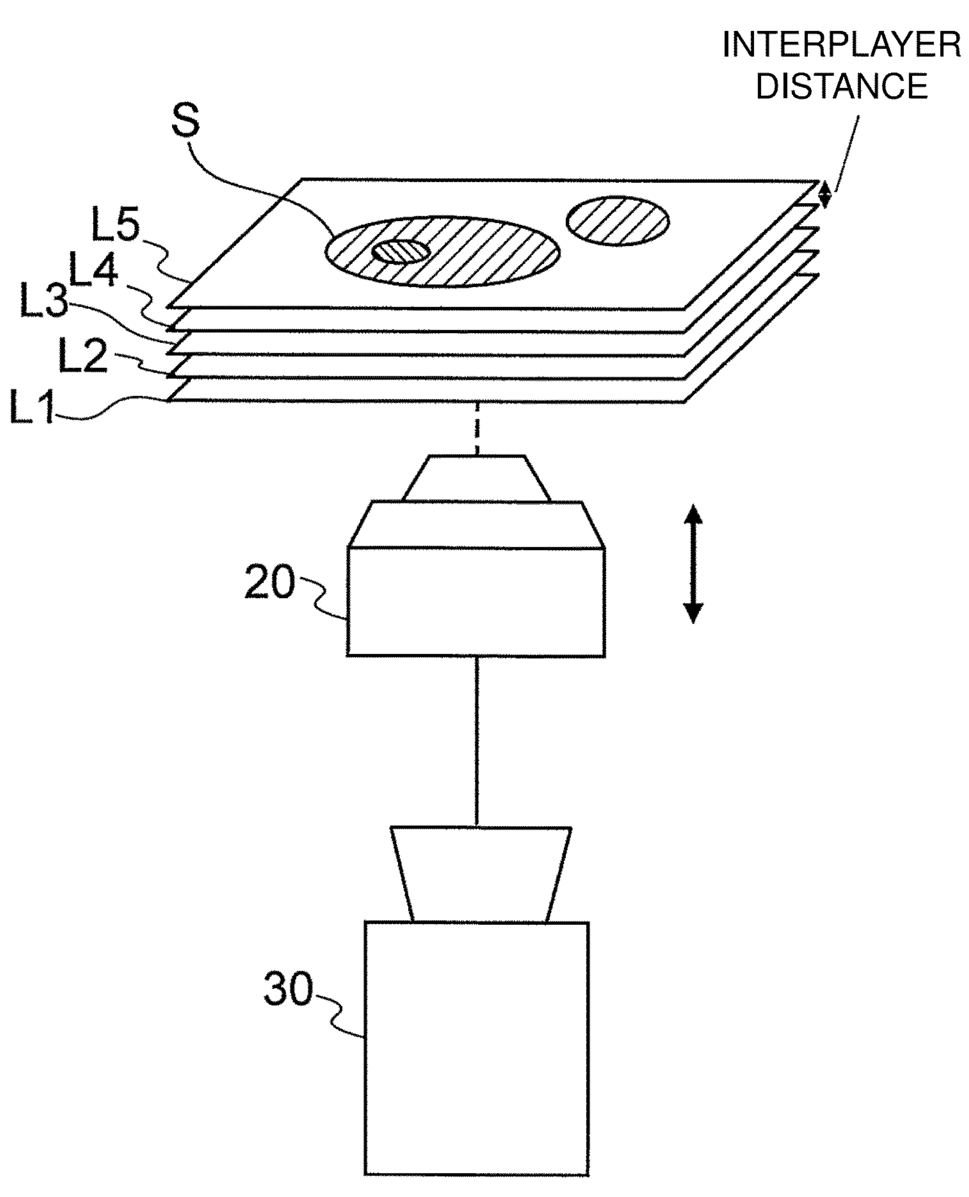
FIG. 2A shows a method of acquiring a three-dimensional microscopic image.

With reference to FIG. 2A, a three-dimensional microscopic image is described. FIG. 2A shows an exemplary method of acquiring a three-dimensional microscopic image. A three-dimensional microscopic image is obtained in the microscope 20 by stacking planar images of a plurality of layers (L1 to L5) with different focal planes in the depth direction. For example, using the imaging unit 30 equipped with the area sensor such as CCD or CMOS, in an optical system in which the area sensor picks up an image on a focal plane on a specimen S, the user repeatedly performs imaging process while gradually varying the distance between the objective of the microscope 20 and the specimen S. Thus, by successively acquiring the planar images of a plurality of layers (L1 to L5), a three-dimensional microscopic image is obtained.

The planar images are acquired by repeating imaging process at an interlayer distance of 250 nm or 500 nm per layer, for example. The interlayer distance is typically about 200 nm to 2 μm.

The depth of field near the focal plane is determined by the optical system. Therefore, the optical system is preferably set so that the interlayer distance and the depth of field are approximately equal to each other. For example, the depth of field is determined by the aperture of the objective and that of the illumination light. When the imaging process is performed with transmitted light, the aperture of the transmitted illumination light becoming incident on the specimen S can be adjusted by an aperture diaphragm.

The distance between the specimen S and the objective is varied by moving the entire optical system of the microscope 20 or part of the optical system including the objective in the optical axis direction by a vertical stage (Z stage). Alternatively, the distance between the specimen S and the objective may be varied by placing the stage 10 with the specimen S on the vertical stage and moving the vertical stage in the optical axis direction.

The vertical stage may be a single stage. Alternatively, the vertical stage may be a combination of two or more types of stages, such as a coarse movement stage for retracting the optical system and a fine movement stage for finely adjusting the distance between the objective and the specimen. The vertical stage can operate in fine movement with sufficient accuracy for the interlayer distance of stacked images.

The position of the vertical stage in imaging should preferably be determined by detecting the position where the cell image is formed by the autofocusing process. Specifically, by quantifying the degree of focusing of the captured image and evaluating the value for the vertical stage position, the best in-focus position may be obtained as the position of the vertical stage in imaging. Alternatively, the distance between the specimen S and the microscope 20 may be measured with a distance sensor using laser or the like to move the vertical stage to the optimal distance.

The imaging range of stacked images is determined based on the focus position and considering the characteristics of the specimen S. For example, in a cytological diagnosis specimen, many cells may be fixed directly on the glass slide and the other cells may be stacked on them. In this case, assuming that the focus position determined from the images is directly on the glass slide, the imaging range and the interlayer distance are set to be sufficient for the height of the stacked cells from the surface of the glass slide.

Based on the type of the specimen S, the control unit 50 acquires in advance the parameters of focus position, imaging range, and interlayer distance. Depending on the type of slide or the content of the image data acquired by the focus process and the position of the vertical stage, the control unit 50 switches the parameters of focus position, imaging range, and interlayer distance. This efficiently produces images of sufficient quality to restore an appropriate three-dimensional image.

In order to integrate the acquired stacked images of a plurality of locations, the control unit 50 records the vertical stage position data in imaging. For example, the control unit 50 detects the vertical stage position using an encoder on the stage 10. Alternatively, the control unit 50 may detect the vertical stage position by totaling the amount of movement of the stage 10 from the origin position. The control unit 50 may detect the vertical stage position by monitoring the pulses of the stepping motor driving the stage 10 and the control pulses input to the controller of the stepping motor by a digital circuit.

In the example shown in FIG. 2A, an image may be captured when the focal plane has completed moving and stopped. Alternatively, an image may be captured when the focal plane has reached a predetermined position while continuously moved. The latter imaging method can capture images faster than the former.

In the latter imaging method, if the distance traveled by the focal plane during the exposure time of the imaging unit 30 is significantly large relative to the depth of field of the optical system, the image may be blurred. To avoid this, the exposure time of the imaging unit 30 and the moving speed of the focal plane are preferably set to match the depth of field of the optical system. Furthermore, when the focal plane is desired to move faster, use of a flash lamp as the illumination 22 will reduce the image blurring caused by the focal plane movement.

The control unit 50 transmits a stage-movement control signal to relatively move the microscope 20 and the stage 10 in a perpendicular direction to the optical axis direction. The control unit 50 also transmits a focal plane control signal to move the focal plane to a predetermined focal coordinate. When the vertical stage reaches the particular position where image is desired, the control unit 50 transmits an imaging timing signal to the imaging unit 30. The imaging unit 30 images an image at the timing of receiving the imaging timing signal.

Figure 2B:
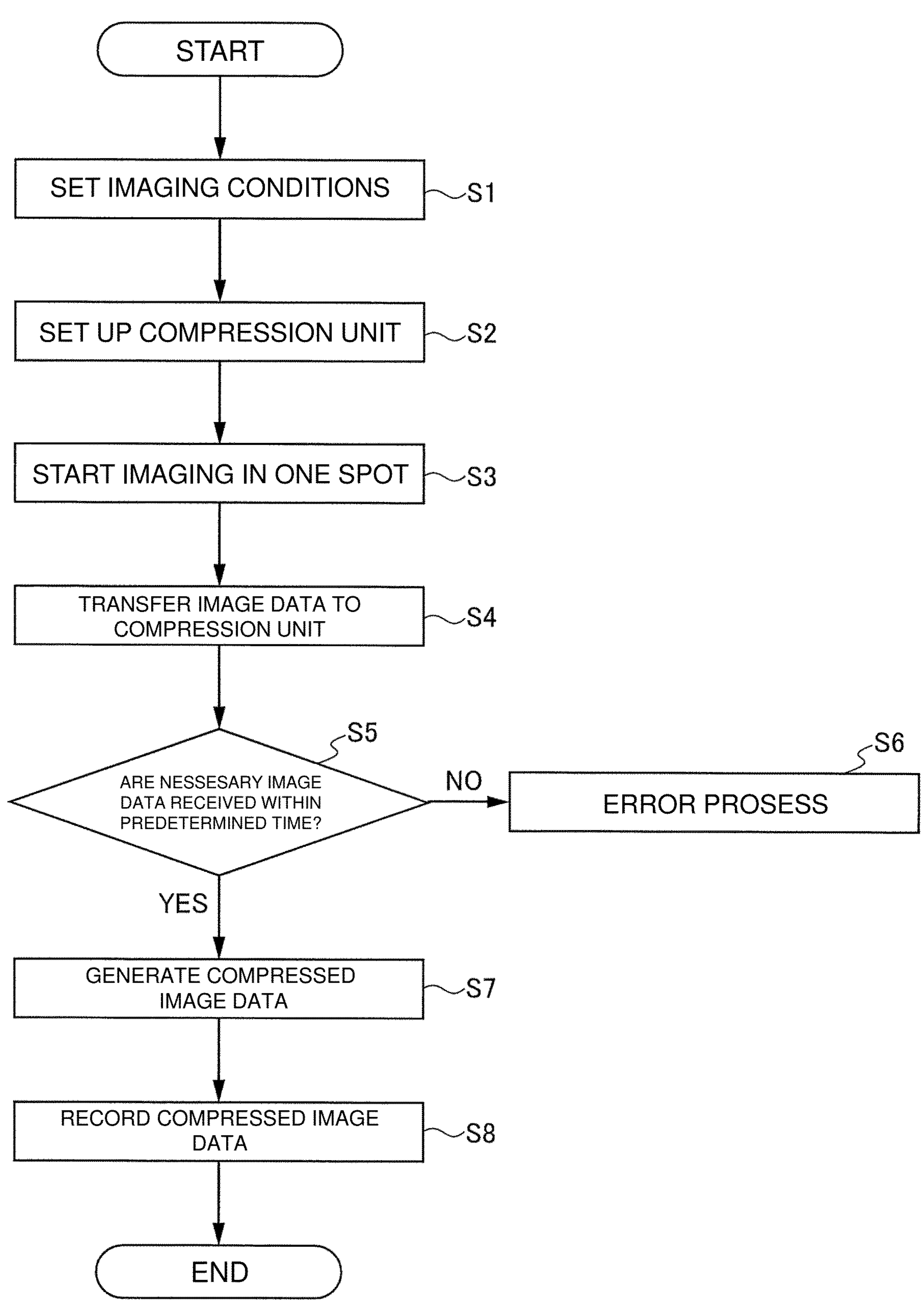
FIG. 2B is a flowchart of single-spot imaging.

FIG. 2B is a flowchart of single-spot imaging. First, the control unit 50 sets the imaging conditions (step S1). Then, the control unit 50 applies the set imaging conditions to the imaging unit 30 and the focal plane moving mechanism 40. The imaging conditions are also applied to the image buffer 55 if used.

Specifically, the control unit 50 applies the conditions to the imaging unit 30 such as exposure time, imaging timing, and imaging count in the Z direction in one spot. As a result, the imaging unit 30 captures images at the desired timing given by the imaging timing signal.

The control unit 50 applies the conditions to the focal plane moving mechanism 40 such as focus position, movement range, and interlayer distance. As a result, the focal plane moving mechanism 40 operates at the desired timing given by the focal plane control signal.

Next, the control unit 50 sets up the compression unit 60 (step S2). Specifically, the control unit 50 sets the compression parameters that determine the imaging count in the Z direction in one spot, the compression quality and others.

Subsequently, the system starts imaging in the Z direction in one spot (step S3). Specifically, the control unit 50 transmits a focal plane control signal to the focal plane moving mechanism 40 and transmits an imaging timing signal to the imaging unit 30. The focal plane control signal and the imaging timing signal are in synchronization with each other. This allows the imaging unit 30 to capture an image at the timing at which the focal plane moving mechanism 40 has moved to a predetermined position. Furthermore, this makes it possible to associate the images captured by the imaging unit 30 and the layers to each other.

Note that, the control unit 50 may not necessarily transmit imaging timing signals at regular intervals.

The image data of an image captured by the imaging unit 30 is transferred to the compression unit 60 (step S4). Here, the image data may be temporarily stored in the image buffer 55. The image data pieces temporarily stored in the image buffer 55 may be sequentially transferred to the compression unit 60. When the interval between the imaging timing signals is short, the image data pieces of images captured in the Z direction in one spot may be collectively transferred to the compression unit 60. Using the image buffer 55, the imaging process and the subsequent process can be separated and paralleled. As a result, the system expedites the entire process from capturing images to storing the images.

The compression unit 60 detects the number of received image data pieces and determines whether it has received image data pieces as many as the imaging count in the Z direction in one spot within a predetermined time. For example, the compression unit 60 determines whether it has received 30 pieces of image data within 3 seconds after receiving the first image data piece.

When the compression unit 60 has not received image data pieces as many as the imaging count in the Z direction in one spot within a predetermined time, the compression unit 60 executes an error process (step S6). Specifically, there may be a case where the number of captured images is less than the number of imaging timing signals. This may occur when the imaging unit 30 fails to properly process the imaging timing signals and to capture images for some layers. As the error process, the compression unit 60 may again capture images of the same spot or perform a timeout process. The compression unit 60 may perform any other necessary subsequent processes including compressing and storing the received image data pieces.

When the compression unit 60 has received image data pieces as many as the imaging count in the Z direction in one spot within a predetermined time, the compression unit 60 compresses the transferred image data pieces to generate compressed image data (step S7). When the image buffer 55 temporarily stores images, the compression unit 60 may read the image data pieces from the image buffer 55 to generate compressed image data.

The compressed image data is transferred to the storage unit 70. The storage unit 70 stores the transferred compressed image data (step S8).

In this manner, the single-spot imaging is carried out.

When imaging in a plurality of spots, once completing imaging in one spot, the control unit 50 moves the stage 10 to the next imaging position and transmits an imaging timing signal. By successively capturing images at a plurality of vertical stage positions, stacked images are obtained. Steps S3 to S8 in FIG. 2B are carried out at each imaging position.

By monitoring the vertical stage positions in real time, the stacked images are acquired with high accuracy and without delay. When the imaging unit 30 is a global shutter image sensor, the shutter timing is the same for all pixels. Accordingly, the vertical stage position in imaging is the same for all pixels.

On the other hand, when the imaging unit 30 is a rolling shutter image sensor, the shutter timing varies among the pixels. The Z position can be estimated for each pixel from the shutter operation timing. Alternatively, all pixels can be exposed at the same shutter timing by strobe exposure, which is attained by extending the exposure time fully longer than the travel time of the rolling shutter and pulsing the microscope illumination after a certain delay time from the imaging timing signal. The imaging position information of the vertical stage for each layer imaged in this manner is stored together with the image information. Here, preferably, information such as illumination aperture, light source intensity, the shutter speed, gain, and white balance of the imaging unit 30 is also recorded.

Figure 3:
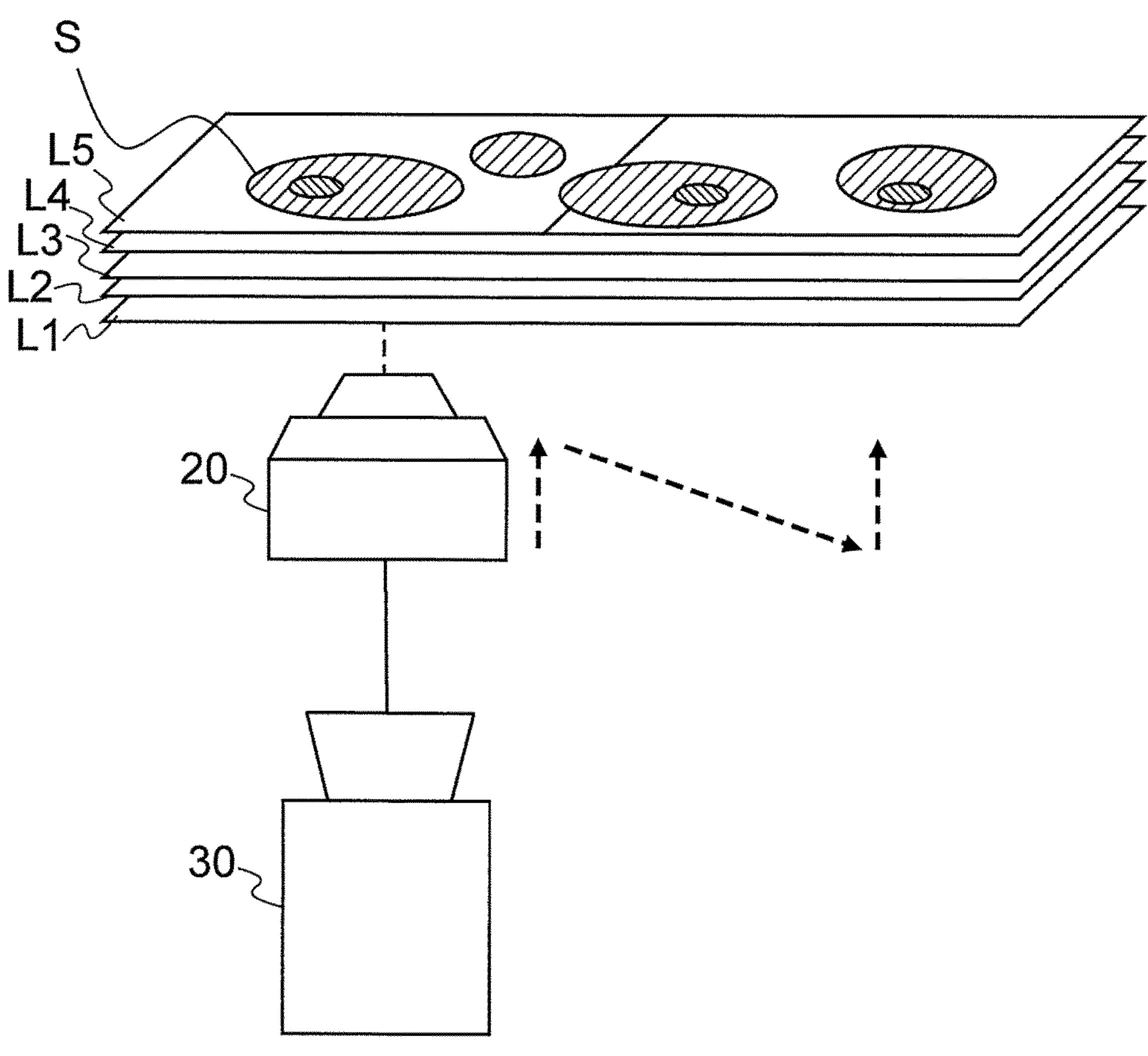
FIG. 3 shows a method of acquiring a three-dimensional microscopic image.

FIG. 3 shows a method of acquiring a three-dimensional microscopic image when the specimen S to be microscopically observed is larger than the field of view of the imaging unit 30. As shown in FIG. 3, while the stage 10 carrying the specimen S is moved on a horizontal plane to change positions, three-dimensional imaging is repeatedly performed for each position. Note that, having the specimen S fixed, the entire microscope 20 or the optical system of the microscope 20 may be moved relative to the specimen S. That is, the microscope 20 and the stage 10 should be relatively moved in a perpendicular direction to the optical axis direction.

Here, by slightly overlapping adjacent spots, the images of the adjacent spots can be pasted together after the imaging to form one larger image.

Figure 4:
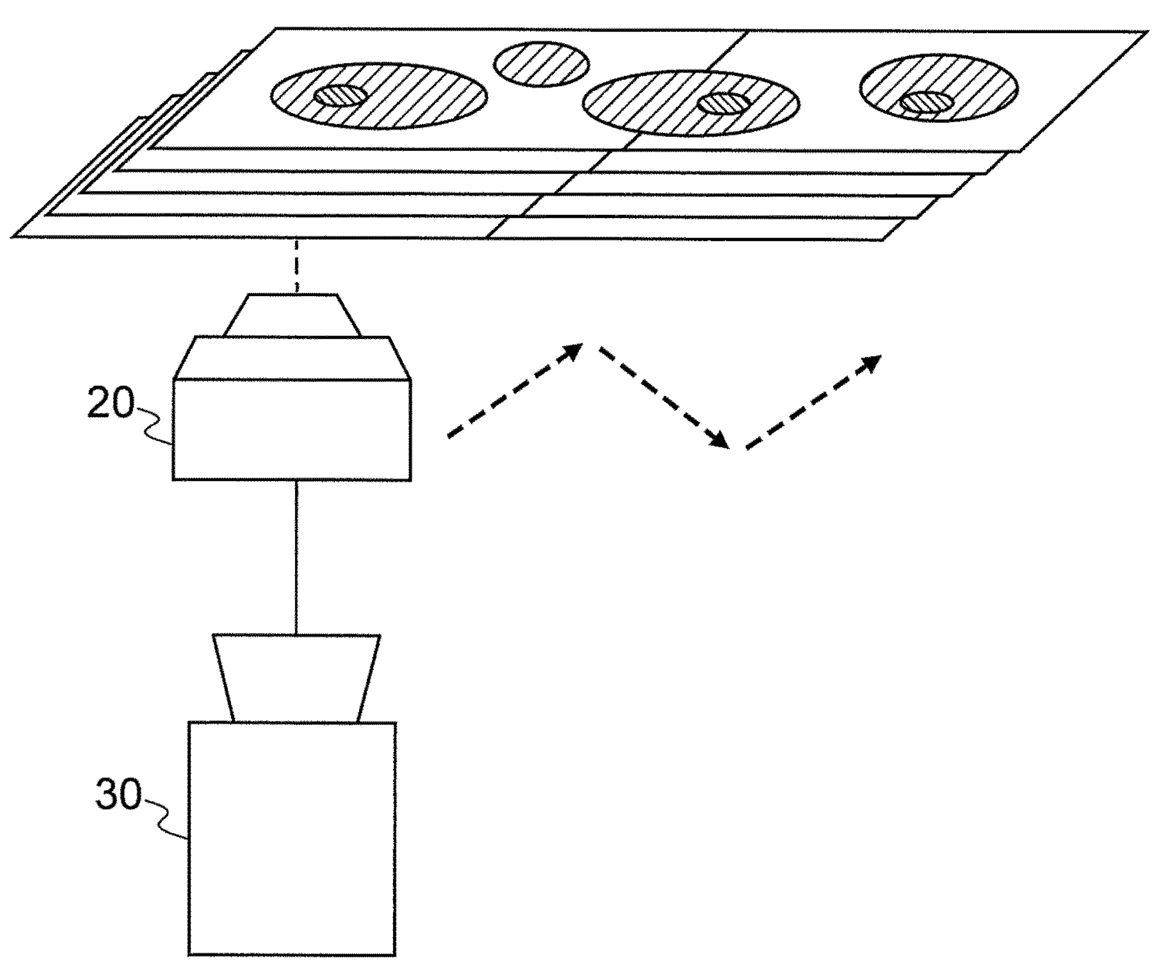
FIG. 4 shows a method of acquiring a three-dimensional microscopic image.

FIG. 4 shows a method of acquiring a three-dimensional microscopic image in which imaging is repeatedly performed having the distance between the objective of the microscope 20 and the specimen S gradually varied and having the position of the specimen S on a horizontal plane continuously moved.

In the method of FIG. 3 where the specimen S is repeatedly moved and stopped, it is preferable to start imaging after the specimen S is stopped and becomes completely still. Therefore, a waiting time occurs. On the other hand, in the method of FIG. 4, imaging is performed having the specimen S continuously moved in the depth direction and on a horizontal plane. This avoids shaking effect that is otherwise caused by the moving the specimen S being stopped. This eliminates the waiting time and realizes high-speed imaging.

Imaging is carried out for a plurality of times having the optical system, such as the microscope 20 and the illumination, and the stage 10 carrying the specimen S relatively moved in the horizontal direction of the two-axis stage 10 (X stage, Y stage). Thus, any position in the imaging range of the specimen S is imaged.

A plurality of focus positions in the specimen S is acquired in advance. From the acquired results, the best focused plane is estimated. Here, the best focused plane is the plane at which the sum of distances from the focused positions becomes smallest. Thus, a focused position at any imaging position of the stage 10 can be calculated.

Other optimization methods may be used to estimate the best focused plane. The best focused plane estimated from the optical characteristics is not limited to a plane. By estimating the best focused plane at the current position based on the focused position and imaging range at the immediately preceding or any previous position of the stage 10, the focused position can be calculated.

The focused position may be acquired from previous imaging data by image processing. Then, correcting the focused position to reflect the result, imaging may be carried out. As a result, stacked images containing the proper focused plane and imaging range are captured for every imaging position.

In order to integrate stacked images of a plurality of locations, the control unit 50 records the position of the stage 10 together with the imaging data. Using the encoder on the stage 10, the control unit 50 detects the position of the stage 10. The position of the stage 10 may be recorded by acquiring the total amount of movement from the origin position of the stage 10.

The resolution of the imaging unit 30 is, for example, 4000 pixel wide by 3000 pixel high. Typical vertical and horizontal pixel counts are about 1000 to 10000 each. For cell observation, the optical magnification should be set so that the pixel size per pixel is about 150 nm to 3000 nm.

The pixel size is the distance on the specimen S per pixel. The pixel size is determined by the pixel size on the sensors of the imaging unit 30 such as CCD or CMOS and the optical magnification. By changing the sensor used and the optical magnification, the pixel size can be adjusted. In capturing images of cells or tissues using a microscope, in order to obtain an image equivalent to a normal 20× objective or 40× objective, preferably the optical magnification and others are adjusted so that the pixel size becomes 500 nm or 250 nm.

The optical resolving power depends on the aperture of the objective of the optical system and the refractive index of the medium. Preferably, the pixel size is designed to be equal to or greater than the resolving power of the optical system. Alternatively, a three-dimensional microscopic image can be acquired by scanning space using a line sensor or a single-channel detector.

The imaging unit 30 acquires black-and-white or color images. A color image has color information such as red-green-blue (RGB). In acquiring a color image, red, green, and blue color filters are disposed on the pixels of the image sensor of the imaging unit 30, for example, in Bayer array. When the imaging unit 30 acquires a RGB color image, by applying the following linear transformation to the acquired RGB data, it can be converted to YUV data or YCbCr data. Here, Y is the luminance component of the image, and U, V or Cb, Cr are color difference components.

[Formula 1]

$$\begin{pmatrix} Y \\ U \\ V \end{pmatrix} = \begin{pmatrix} 0.299 & 0.587 & 0.114 \\ -0.14713 & -0.28886 & 0.436 \\ 0.615 & -0.51499 & -0.10001 \end{pmatrix} \begin{pmatrix} R \\ G \\ B \end{pmatrix}$$

$$\begin{pmatrix} Y \\ Cb \\ Cr \end{pmatrix} = \begin{pmatrix} 0.299 & 0.587 & 0.114 \\ -0.168736 & -0.331264 & 0.5 \\ 0.5 & -0.418688 & -0.081312 \end{pmatrix} \begin{pmatrix} R \\ G \\ B \end{pmatrix}$$

In observing cells with the microscope 20, the luminance component preferably has high resolution for observing the contour and internal structure of the cells and sparsely located particles. On the other hand, the color difference components of relatively low resolution may suffice. For example, in observing a cell nucleus stained blue with hematoxylin, color information just enough to identify the target as a cell nucleus will suffice so long as the contour is defined at high resolution. Hence, chroma sampling, i.e., reducing the resolution of the color difference components while maintaining the high resolution of the luminance component, is performed by converting an RGB image to YUV data or YCrCb data in which the luminance component and the color difference components are separated. This realizes data compression without inhibiting observation of cells and others. Examples of chroma sampling include 4:2:2 in which the luminance component Y has its resolution kept intact and the color difference components U, V have their horizontal resolution reduced by half, and 4:2:0 in which the color difference components U, V have their horizontal and vertical resolution reduced by half.

The compression unit 60 compresses a three-dimensional microscopic image. The compression unit 60 divides images of each layer into blocks. Furthermore, the compression unit 60 compresses data using schemes such as intra-layer prediction, inter-layer prediction, and entropy coding on a block-by-block basis. When a color microscope image is to be divided into blocks, the image should preferably undergo YUV conversion and chroma sampling in advance.

Figure 5:
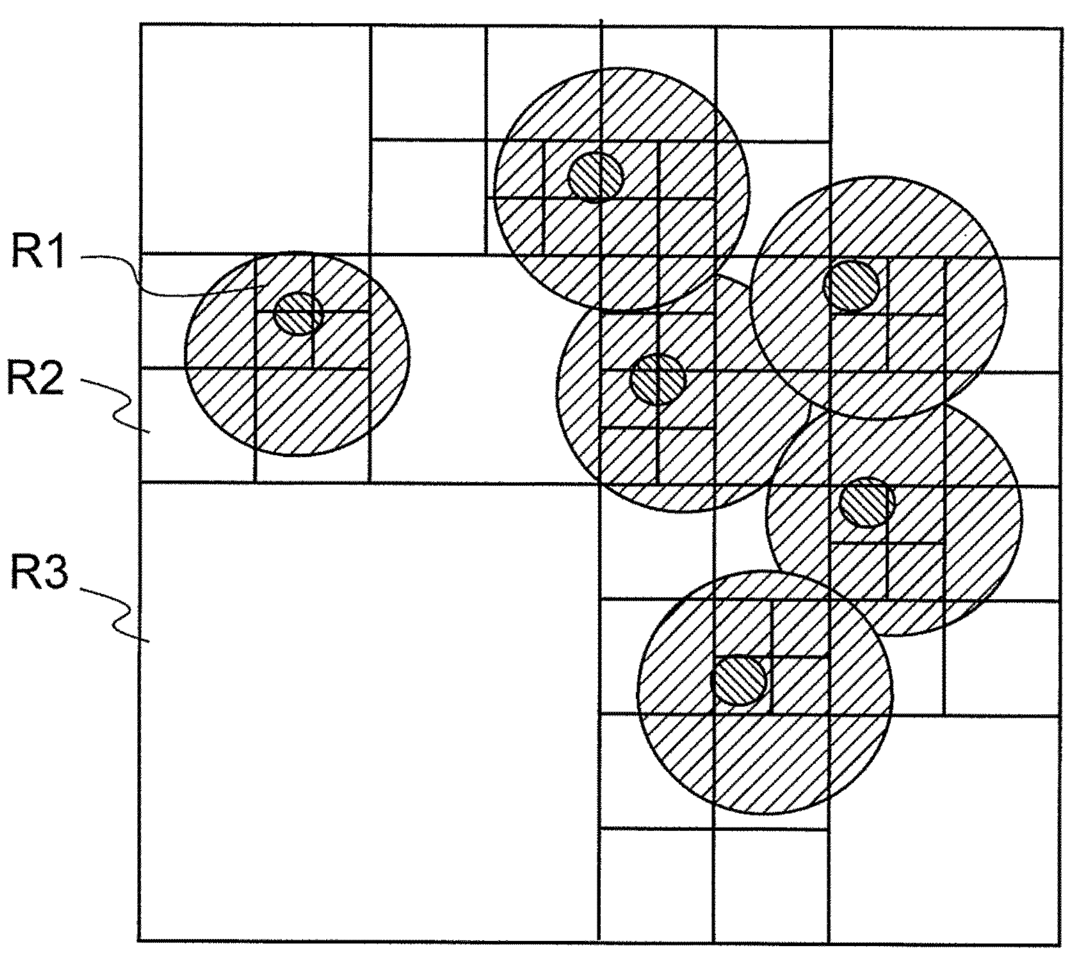
FIG. 5 is an explanatory illustration of dividing a microscopic image into blocks.

In the following, with reference to FIG. 5, a description will be given of block division by the compression unit 60. A large image of 4000 pixels×3000 pixels, for example, is first divided into blocks to facilitate various operations for compression. The block division can produce combinations of blocks of different sizes, such as 4 pixels×4 pixels, 8 pixels×8 pixels, 16 pixels×16 pixels, 32 pixels×32 pixels, 64 pixels×64 pixels, and 128 pixels×128 pixels.

The compression unit 60 does not necessarily divide an image into square blocks. For example, the compression unit 60 may divide an image into rectangular blocks. The compression unit 60 may not evenly divide the entire image into blocks. For example, the compression unit 60 may divide a region R1 having a complex cellular structure into smaller blocks to densely encode. On the other hand, the compression unit 60 may divide a region R2 with a monotonous image pattern into larger blocks to increase the data compression effect. The specimen S obtained as cytology also includes a region R3 where no cells are present. The compression unit 60 divides the region R3 with no cells into larger blocks and divides the region R1 with structures requiring close structural observation such as a cell nucleus into smaller blocks, and thus effectively increases the data compression effect.

Figure 6:
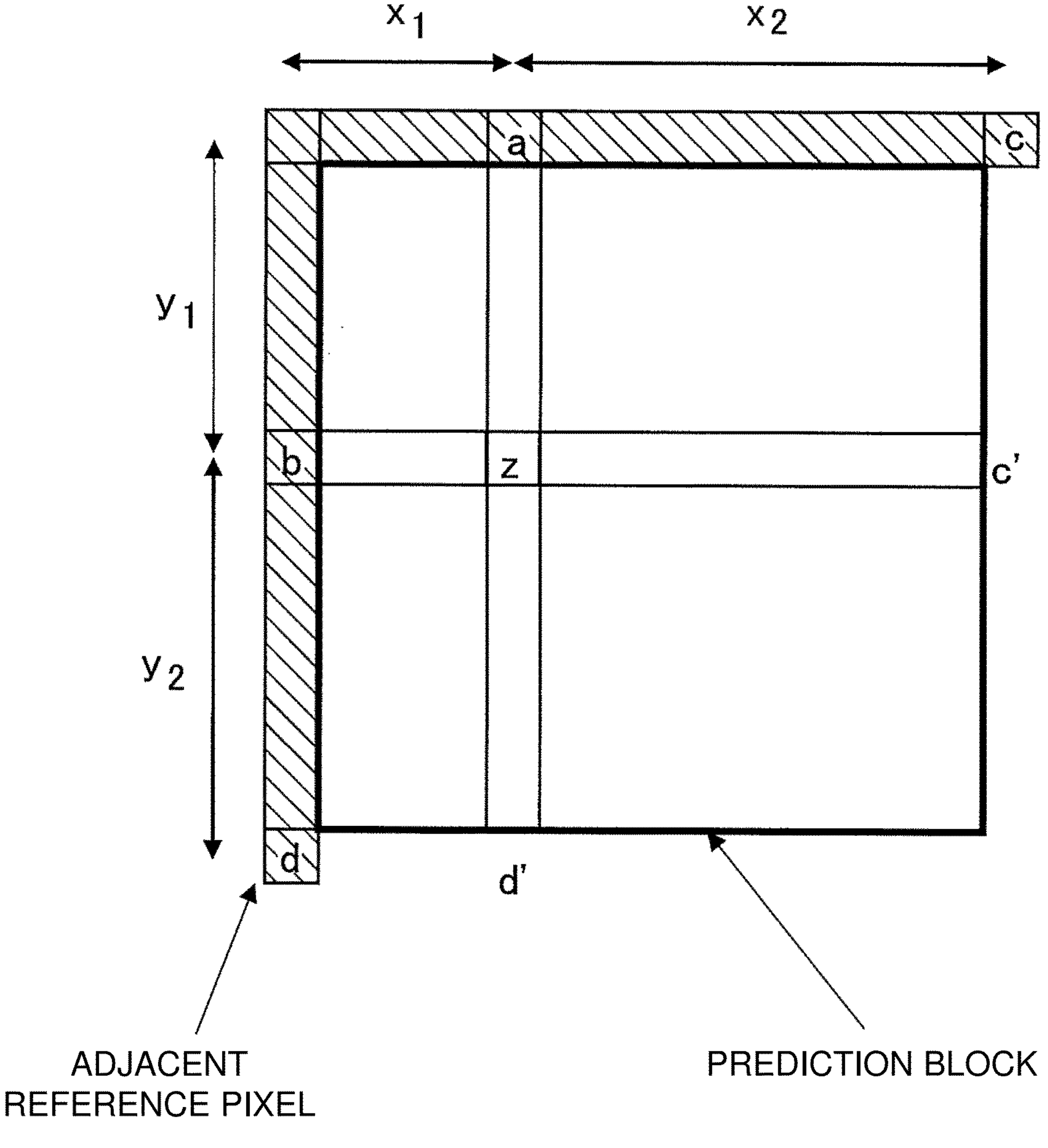
FIG. 6 is an explanatory illustration of intra-layer prediction.

In the following, with reference to FIG. 6, a description will be given of the intra-layer prediction by the compression unit 60. In the intra-layer prediction, the compression unit 60 estimates an image in each block of each layer by applying the distribution of luminance values to an appropriate mathematical model. Then, the compression unit 60 compresses the data volume by expressing the original image using the prediction value and residuals.

In the intra-layer prediction, the compression unit 60 predicts the luminance value of a pixel in a prediction block from the adjacent reference pixels. FIG. 6 is an explanatory illustration for Planar prediction, which is an example of the intra-layer prediction. In Planar prediction, the compression unit 60 refers to the luminance values of the adjacent reference pixels indicated by a, b, c, d in FIG. 6 to predict a luminance value z of one pixel Z. Here, in the x direction, the pixel Z is located at the position where the prediction block is divided by the ratio of $X_1$:$x_2$. In the y direction, the pixel Z is located at the position where the prediction block is divided by the ratio of $y_1$:$y_2$. It is assumed that the pixel c' and the pixel c are identical to each other in luminance value and the pixel d' and the pixel d are identical to each other in luminance value.

As shown in the following formulas, the compression unit 60 calculates a predicted value $z_1$ from the linear prediction in the x direction using luminance values b, c. The compression unit 60 also calculates a predicted value $z_2$ from the linear prediction in the y direction using luminance values a, d. The compression unit 60 then uses the average value z of the predicted values $z_1$, $z_2$ as the Planar prediction value.

[Formula 2]

$$z_1 = \frac{cx_1 + bx_2}{x_1 + x_2}$$

$$z_2 = \frac{dy_1 + ay_2}{y_1 + y_2}$$

$$z = (z_1 + z_2)/2$$

The compression unit 60 may perform the intra-layer prediction other than the Planar prediction, such as DC prediction and Angular prediction.

The compression unit 60 can selectively determine the prediction method for each prediction block with high compression performance. This achieves high compression effect for the entire image. When a color image is separated into a luminance component and color difference components by YUV conversion or the like, the intra-layer prediction can be applied to each of the luminance component and the color difference components.

Figure 7:
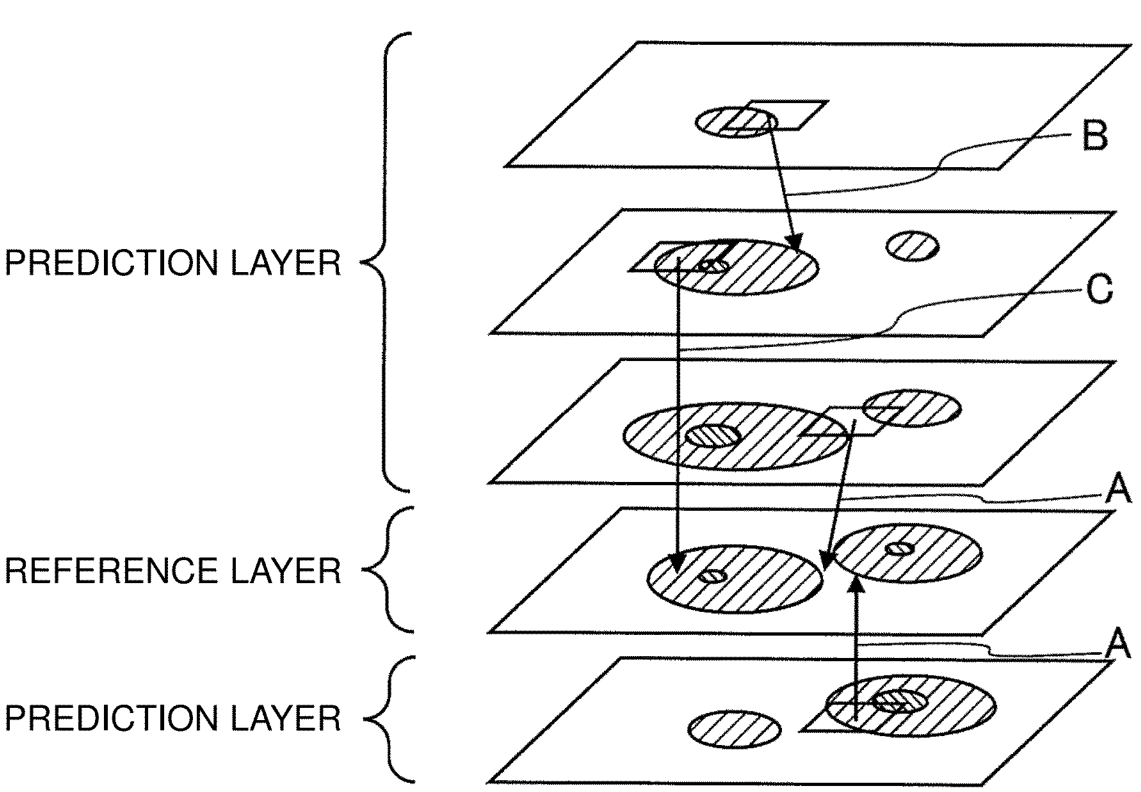
FIG. 7 is an explanatory illustration of inter-layer prediction.

In the following, with reference to FIG. 7, a description will be given of the inter-layer prediction by the compression unit 60. In the inter-layer prediction, the compression unit 60 predicts the displacement of an image across a plurality of layers. In a microscopic image of cells or the like, the patterns of images in neighboring layers are similar. Therefore, the compression unit 60 performs the inter-layer prediction using the neighboring layers and encodes the image of the target layer separately as prediction and residual. If the prediction is highly accurate, the residual information becomes extremely small. Therefore, by encoding the target frame using prediction and residual information, the data size becomes smaller than what is obtained by compressing solely, resulting in high compression effect.

A portion of the target three-dimensional microscopic image is set as a reference layer that is encoded solely without using the inter-layer prediction. Preferably, at least one reference layer per a series of stacked images should be set. When images of a plurality of spots are successively captured as in FIG. 3, at least one reference layer is preferably set for each spot. Any layer in stacked images can be used as the reference layer. For example, a layer around the center, the uppermost layer, the lowermost layer, or the layer imaged on a plane directly on the glass slide can be used as the reference layer.

Image layers other than the reference layer are predicted layers. The predicted layers are encoded with the predicted values and residuals from the neighboring images. As indicated by arrows A in FIG. 7, the compression unit 60 estimates each predicted layer from one upper or lower adjacent image. The compression unit 60 may predict each predicted layer by referring to a plurality of adjacent images, including both upper and lower directions.

As to a large image, it is preferable to divide a microscopic image into blocks and perform the inter-layer prediction on a block-by-block basis. The blocks used here may be the same as those used for inter-layer prediction described above, or may be ones obtained by dividing each of the blocks into smaller blocks of, for example, 8 pixels×4 pixels, 4 pixels×8 pixels, or 8 pixels×8 pixels.

Note that, for example, as to a portion where the surface of a cell is skewed, as indicated by arrow B in FIG. 7, by prediction referring to an image away from the immediately corresponding location on the referred layer, i.e., an image located diagonally above or below, the image data may be effectively compressed. As indicated by arrow C in FIG. 7, the compression unit 60 may predict a predicted layer by referring to an image of two or more layers away. Preferably, the block's position or the layer to be referred to for prediction can be searched for in appropriate combinations on a block-by-block basis.

By combining the intra-layer prediction and the inter-layer prediction for each divided block, the compression unit 60 can effectively compress data. Conventional JPEG and JPEG 2000 compress two-dimensional images one by one. On the other hand, when the layers are minutely set in a three-dimensional microscopic cell image, images of adjacent layers are highly similar to each other. Therefore, the inter-layer prediction realizes efficient compression.

The compression unit 60 may further perform orthogonal transformation on data having undergone the intra-layer prediction and the inter-layer prediction. The orthogonal transformation compresses data by converting image information into frequency domain. The compression unit 60 preferably performs orthogonal transformation for each block of a divided image. The size of each block may be, for example, 4 pixels×4 pixels, 8 pixels×8 pixels, 16 pixels×16 pixels, or 32 pixels×32 pixels.

The orthogonal transformation may be discrete cosine transform or discrete sine transform. Some blocks may not require any transformation. The discrete cosine and discrete sine transforms should be performed with integer precision rather than real number precision. This provides constant results independent of the environment and increases the operation speed.

The compression unit 60 may further compress the data of each block by entropy coding. The entropy coding scheme may be, for example, Huffman codes, context-adaptive variable-length coding (CAVLC), or context-adaptive binary arithmetic coding (CABAC).

As described above, the compression unit 60 compresses a three-dimensional microscopic image to reduce the data volume while minimizing image degradation. On the other hand, since the compression unit 60 performs complex computations on a large number of input images, it requires long time for the compression computations. The computation processing speed must be increased.

To reduce the time required for the computation processing, it is preferable to reduce transfer and storage of uncompressed image data. To this end, once a three-dimensional image is captured, the image is promptly compressed to quickly reduce the data volume. A three-dimensional microscopic image can be acquired by, for example, successively capturing planar images of a plurality of layers using the imaging unit 30 equipped with an area sensor such as CMOS. In this case, the image data is preferably promptly compressed in the imaging unit 30 or in a computer receiving the image data signal from the imaging unit 30.

It is also possible to share the computation processing. For example, the imaging unit 30 may perform YUV-conversion on planar images and chroma sampling on the data to 4:2:2 or 4:2:0, and the computer may perform compression computations on a three-dimensional image formed of a plurality of planar images. When the imaging unit 30 includes a color sensor having RGB pixels in Bayer array, the raw data of the Bayer array may be transferred to the computer as is, and the computer may perform the YUV conversion and the chroma sampling, followed by additional compression.

Compression computations of a three-dimensional microscopic image consisting of planar images of a plurality of layers can be performed faster using hardware such as a dedicated integrated circuit. For example, the ISP (Image Signal Processor) in the imaging unit 30 is equipped with parallel hardware that performs Bayer array demosaicing as well as image color correction, normalization, cropping, lens aberration correction, and noise reduction. These functions perform image optimization on a three-dimensional image for enhancing the quality including the compression ratio and data when compressed, before being output and transferred from the imaging unit 30. Here, the fast processing speed may be achieved without inhibiting the real-time processing by dividing the hardware with the processing time per processing element being equal to or less than the acquisition time per frame, or by setting a buffer between the camera and the processing elements and between the processing elements and the output.

High-speed interface such as USB 3.0, USB 3.1, MIPI, and Ethernet are used for output from the imaging unit 30. Such hardware for image processing for compression may not necessarily be installed inside the imaging unit 30 but may be installed inside the computer or SoC (System on Chip) receiving the image data from the imaging unit 30.

The transferred images are saved in a frame buffer or SRAM on the chip as well as in DRAM or other memory connected to the computer. The image processing for compressing can be done by an ISP, which is hardware integrated similarly to the inside of the imaging unit 30, or a GPU (Graphics processing unit) that is integrated in parallel. The GPU contains an array of parallel arithmetic units capable of general-purpose image processing, VRAM (Video RAM) capable of transferring data at high speeds to the arithmetic units, and a graphics pipeline for image processing, and achieves real-time processing similar to hardware processing through software processing.

The required parallel hardware may be implemented using an FPGA (Field programmable gate array) integrated inside the SoC for image processing. The data after image optimization is saved in RAM on the chip or on the connected DRAM. For compressing the image data having completed the image optimization, a hardware encoder integrated on the chip or an encoding process implemented on a GPU or an FPGA may be used. When such an encoder is used, the image data is divided or cropped to an image size and frame rate suitable for encoding in the preceding image optimization. Then, the compression process starts from storing data in RAM on the chip or transferring data to a data transfer bus to which the encoder is connected.

The processing unit is preferably stacked images of an identical location where the image similarly is high and high compression quality is achieved, but not limited thereto. The stacked images of a plurality of locations may be encoded in a batch to improve efficiency. Here, by using a plurality of arithmetic units including the encoder simultaneously, and saving and passing data in progress to the image buffer 55 configured on RAM on the chip or on the connected DRAM, the data transfer time and the arithmetic time are overlapped to reduce the overall processing time. This realizes real-time processing.

When the image buffer 55 is configured as part of the output side of the imaging unit 30, even when the interval between imaging timing signals of the imaging unit 30 is shorter than the data output rate from the imaging unit 30, image signals can be stored in the image buffer 55 and output in parallel. This increases the imaging speed to the upper limit of the sensor.

When the compression unit 60 is configured as part of the input side of the image buffer 55, the compression unit 60 can compress images once the specified number of images are ready in the image buffer 55. This achieves efficient processing.

When the format of the output image of the imaging unit 30 and the format of the image required by the compression unit 60 are different, a plurality of image buffers may be prepared on the input side of the compression unit 60 to perform conversion in parallel. This realizes real-time processing while keeping the input frame rate of the imaging unit 30 and the operating frame rate of the compression unit 60 at the maximum value that the hardware can take.

Depending on the content of the compression, part of or the entire processing may be executed by software processing by a CPU. In this case, data input/output to/from the encoder is performed in a memory area accessible by the CPU, so that real-time processing is realized by the pipeline operation of the software and the encoder.

The compressed data is saved in RAM on the chip or the connected DRAM, and then stored in external storage such as SSD or HDD. The compressed data may be directly written from a data transfer bus to the external storage without going through the buffer. Since access to the external storage takes time, the compressed data is preferably written in the storage at the timing when it needs to be stored. If necessary, additional encoding or computation processing may be performed on the compressed data.

As explained with reference to FIG. 2A, the control unit 50 changes the distance between the specimen S and the objective of the microscope 20 synchronously with the imaging by the imaging unit 30. Here, the control unit 50 preferably records the positional information of the vertical stage for each layer with the image of each layer. As shown in FIGS. 3 and 4, a three-dimensional microscopic image of the entire or specific part of the specimen S as the target may be acquired by repeatedly performing the imaging having the position of the specimen S on a horizontal plane moved. In this case, by recording the positional information (X and Y coordinates) of the stage 10 in addition to the positional information of the vertical stage, the images located differently by the layers can be correctly arranged and integrated while reducing the whole imaging time. The positional information of the vertical stage and that of the stage 10 are preferably acquired at the timing of capturing each image and recorded together with the generated compressed image. For example, the distance information between layers in stacked images captured having the vertical stage moved may become necessary for deconvolution calculation. When the imaging is performed at plurality of spots as shown in FIG. 3, the positional information of the spots is useful in pasting the images of respective spots together to acquire the overall image.

Imaging information includes, in addition to the stage position, the magnification and type of the objective, the presence and type of optical elements such as optical filters and dichroic mirrors, the camera's exposure time, and camera settings such as ISO sensitivity, gain and white balance, illumination level, and aperture position.

In order to successively image a plurality of specimens S, preferably, the control unit 50 also acquires the information of each imaged specimen S, such as the number assigned to the specimen S. When the target specimen S is a glass slide, the information of the specimen S is generally written on the label of the glass slide. By capturing the image of the entire glass slide and recording the information together, the glass slide information and the stacked images of the imaged specimen S are associated with each other.

Here, in order to protect personal information, the control unit 50 may specify a particular portion to exclude a portion of the slide label information from being stored. In some cases, the number and model names of the devices used in the imaging, and the information of the user who performed the imaging may become necessary. The control unit 50 may manage these pieces of information integrally with the generated compressed image, and may attach the information to the image in storing or transferring it. Alternatively, the control unit 50 may store these pieces of information in a separate database or the like, and may record the ID number uniquely assigned to the record together with the generated compressed image.

Without being limited to attaching the information when imaging, the control unit 50 may attach the information to the compressed image when compressing already captured microscopic images. When positional information, imaging information, information on the specimen S and the like are attached to already acquired microscopic stacked images, by recording compression data obtained by compressing vertical stacked images together with the imaging information and the specimen information, it becomes possible to properly perform tiling and deconvolution after decoding the compressed image or to correctly select the intended image of the specimen S for observation.

The positional information of stacked images may be the existing positional information recorded when the images are acquired by the microscope 20. Alternatively, the positional information may be generated by tiling and pasting the stacked images together and estimating the position of each image based on their pattern matching. Information, estimated from image's background, cell luminance information, and color information, may be attached to the imaging information.

The control unit 50 stores the compressed three-dimensional image in the storage unit 70. The control unit 50 transfers the compressed three-dimensional image from the transmission unit 80 over a network to a server or storage in the cloud. The compression reduces the data size and facilitates smooth data transfer. The data transfer allows access to external computing resources, which can be accessed by many people or from remote locations.

A compressed three-dimensional image is restored to stacked two-dimensional images by decoding for easier viewing and image processing calculations. For example, image processing by artificial intelligence such as deep learning using the decoded three-dimensional image as an input can automatically detect specific types of cells and also classify the detected cells. The data may be stored in a compressed file format while not used for viewing or other processing and decoded when needed.

For decoding operations, data is first separated into compressed image data and attached data, i.e., coordinate data or imaging information data and specimen information data attached to images and saved. The separated compressed image data contains stacked images of at least one location as compressed images. The stack is restored to two-dimensional image data for each location and layer by decoding operations. The data separation and decoding calculations are performed by a CPU, a GPU, hardware for decoding, an FPGA implementing hardware for decoding prepared on a server or storage in the cloud for data read from the server or storage in the cloud. When the cloud is used, by dynamically allocating calculation resources according to the time required for decoding operations and the amount of data processed, fast and inexpensive decoding operations can be achieved. The data size increases after the decoding. Therefore, preferably, the decoded images are saved in a large-capacity memory and undergo any subsequent processing, or stored in a large-capacity or distributed storage.

Figure 8:
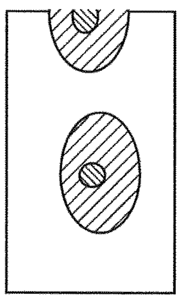
FIG. 8 is an explanatory illustration of a tiling process.
Figure 8:
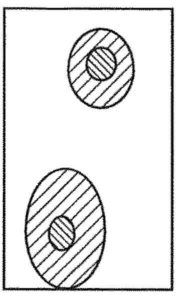
Figure 8:
Figure 8:
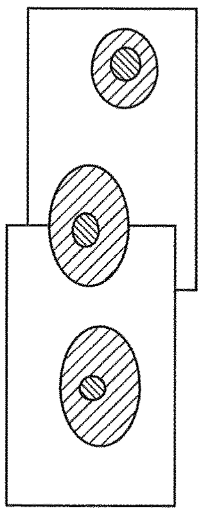
Figure 9:
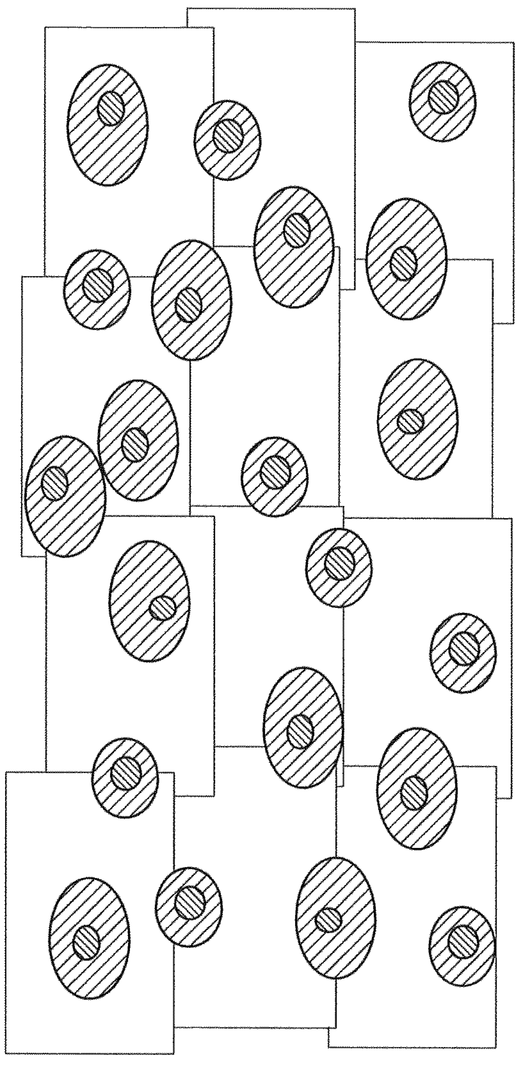
FIG. 9 is an explanatory illustration of the tiling process.

Decoded images are data of stacked images of one or a plurality of spots. When the decoded images are stacked images of a plurality of spots, and the images of a plurality of spots are to be pasted together to form one larger image, a tiling process is performed. That is, the images of respective spots are pasted together like tiles. FIGS. 8 and 9 show an exemplary tiling process. In the tiling process, images in an overlapping region between adjacent spots are compared, and the images are combined at the position where the image patterns of both images match. Here, if the compared images of adjacent spots are blurred, accurate positioning is difficult. Therefore, it is preferable to select an image that is in focus from among the planar images of each spot, compare the selected images of adjacent spots, and determine the image position after tiling in each spot. Then, an image integration process, i.e., pasting images of the adjacent spots together, is performed for each layer of the stacked images. This provides integrated stacked images in which stacked images of respective spots are pasted together. Only the layers of images containing the regions in focus may be integrated, with the number of layers after the integration process capped at the number of imaged layers.

Figure 10:
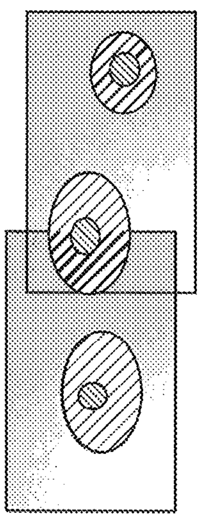
FIG. 10 is an explanatory illustration of the tiling process with uneven illumination.
Figure 10:
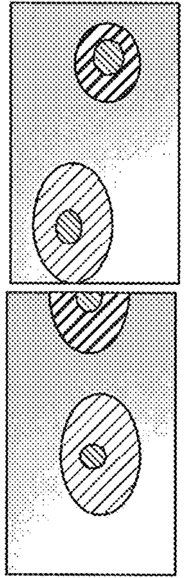
Figure 11:
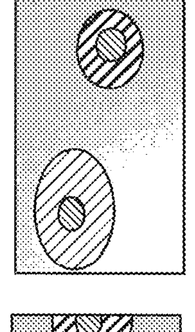
FIG. 11 is an explanatory illustration of the tiling process after luminance correction.
Figure 11:
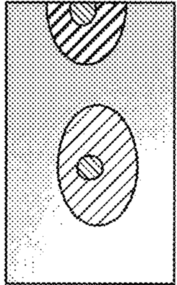
Figure 11:
Figure 11:
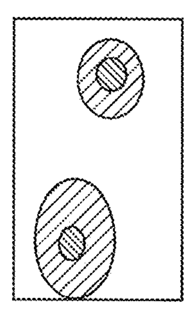
Figure 11:
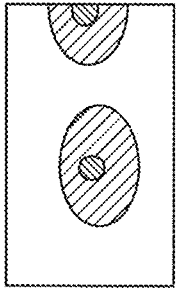
Figure 11:
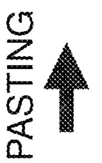
Figure 11:
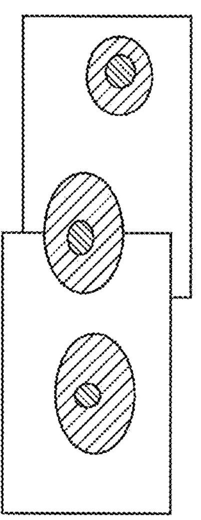
Figure 12:
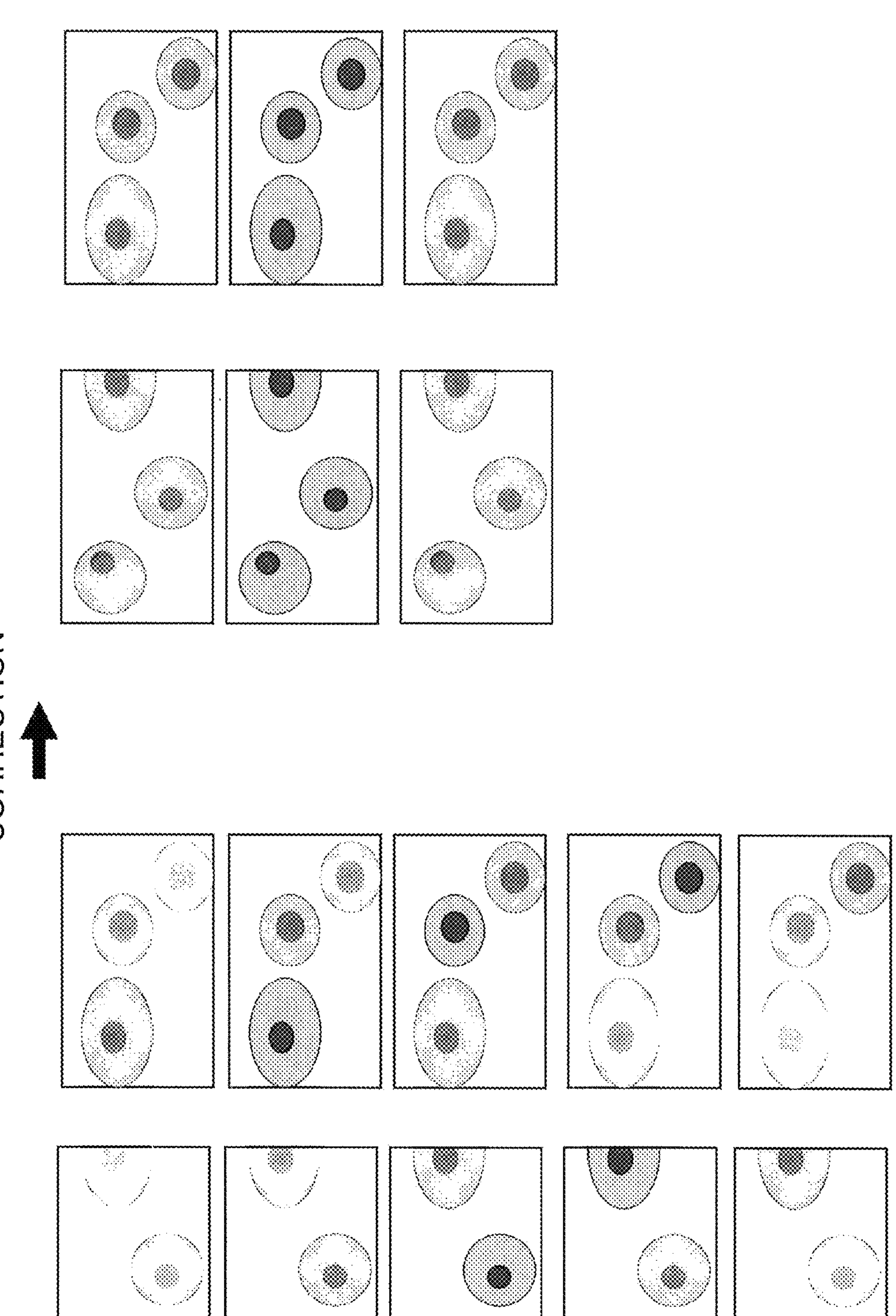
FIG. 12 is an explanatory illustration of focus correction.

When performing the tiling process, it is desirable to perform image processing in advance to make the image suitable for viewing and subsequent data processing by adjusting the luminance and color information of the entire specimen. In particular, as shown in FIG. 10, if the luminance and contrast vary by locations in an image due to uneven illumination or the like, performing the tiling process as it is may cause a shift in luminance in the pasted region, resulting in an awkward appearance. To avoid this, as shown in FIG. 11, the luminance and contrast are preferably adjusted in advance so that the luminance and contrast of the whole image of each spot attain generally the same level.

When the optical axis of the microscope 20 is not perfectly perpendicular to the object, the image focus may vary by locations in a captured image. In such a case, a focusing process that combines images of the same focus plane from the stacked images will convert the images with uneven focus conditions to stacked images in which the focus condition of the entire image is uniform.

Alternatively, before or after the tiling process, deconvolution calculation may be performed on the stacked images to obtain images with reduced blur caused by out-of-focus.

The integration process yields one or more layers of integrated image data suitable for viewing and subsequent AI analysis for the whole specimen. The only data dependency in the integration process is the relationship between adjacent imaging positions. Therefore, the integration process can be executed in parallel to expedite processing. Distributing the image storage area used for the integration process, input/output and processing can be executed in parallel using parallel arithmetic units such as CPUs and GPUs. If the execution time of data input/output to/from storage becomes an issue, image(s) of one or more layers can be mapped onto memory to be processed in parallel.

The images of a plurality of layers after the integration process have the size of 80000×80000 pixels when the resolution per pixel is 250 nm and the sample region is 20 mm×20 mm. Therefore, even if a 4K monitor is used, only about 1/20 of the entire image can be displayed in terms of the ratio of the length of one side, making it impractical to view the image as it is. In addition, when actually viewing the image, it is desirable to move around on the image, zooming in and out of details from the entire specimen. In view of the foregoing, it is useful to create scale-down images that are reduced in size in steps from the full-size image, and then divide each image and store the divided images, so that the image at any location at any magnification can be read at high speed. For example, from the original size, images as large as by 1/2, 1/4, and 1/8, respectively, are obtained. The reduced-size images are then further divided into smaller blocks, such as 256- or 512-pixel squares. This reduces the image size to be read and speeds up readout.

Such a series of images with different resolutions in steps is called an image pyramid or the like. An exemplary image pyramid is Deep Zoom File Format released by Microsoft Corporation, in which block images of each pyramid are saved as individual image files in JPEG or PNG format, and information needed in reading the image pyramid, such as the size of the entire image or the size of each block, is saved in XML format.

The image pyramid is not limited thereto. For example, images of multiple magnifications may be split, concatenated and stored in binary format with index headers for reading. In this data structure, accessing the headers will specify the read location and read necessary data at high speed. The binary data stored here may be bitmap images after decoding, or compressed images in JPEG format or other formats compressed to a level that does not affect decoding quality. Accompanying information attached to an image such as imaging information, coordinate information, three-dimensional layer information, focus position information, and information about the cells obtained by image analysis may be read out together with the image.

For image readout, software and APIs may be provided to read out images at high speed. Software can perform single or multiple image readout processes and converts the image format for output if necessary. To read out an image, the user sends a read command to the software specifying the X, Y, Z positions, resolution, and image format of the required image. This provides the required image data from an image in binary format. The information accompanying the image can be converted to the required format and output. A user interface for 3D image data equivalent to operating the microscope 20 can be implemented by returning an output of the image at the position in real time in response to an input parameter including a Z position.

To read data from the server or cloud by a web application for display or analysis, a URI encoding the identification information of the specimen S, the location where the data is to be acquired, and the information of the necessary image is sent as a request from the web application side, and the server/cloud side transfers the necessary information and image data as a response. To ensure data security, this communication is protected by encryption and access tokens, and the data is exchanged according to the required authentication. Alternatively, it is realized on the server/cloud side as a data acquisition API with an authentication function. An access to image data is for the acquisition of image data of a limited area for display or analysis of a single specimen. Therefore, the dependency of the required image data on the server side is extremely low. Thus, use of an API server and a Web server that support distributed storage and parallel access allows for a scalable system that can quickly respond to a large number of accesses from multiple users. To address such image readout, an API is configured to operate in parallel, receiving input parameters including the identification information, X, Y, and Z positions, resolution, and image format of the required image, and the organization information and authentication information of the accessing user, and returning the image and accompanying information in the required format. Thus, a web application can implement a user interface for 3D imaging data equivalent to operating the microscope 20.

When displaying the decoded three-dimensional image on a computer window, the depth position can be switched back and forth to make it appear as if the depth has been moved back and forth using the microscope 20. To switch the depth, a user interface such as a switching slider or button may be provided on the window. Alternatively, a track wheel on the mouse, key bindings on the keyboard, or a dial-like device similar to the focus ring on the microscope 20 can be used to switch the depth. These schemes allow for an operation feel similar to that of the microscope 20. The user may freely change the horizontal position or magnification using a similar user interface.

In presenting three-dimensional display, performing deconvolution on decoded images will provide clearer display result. By connecting the layers of three-dimensional images to each other only at the in-focus portions and displaying the resultant image, one combined two-dimensional image can be displayed.

As described above, an interface for three-dimensional images similar to that of the microscope 20 is realized. In addition, the viewpoint, orientation, and magnification on a three-dimensional microscopic image can be freely changed. Tomographic images can be presented or displayed on a three-dimensional display. For example, as one display format, a plurality of image layers are placed in a virtual space while maintaining their three-dimensional positions. For each voxel, a color, transmittance, or reflectance according to its luminance information or color information, or its angular distribution and others are set. By setting one or more points of illumination and any point of viewpoint to the virtual space, a three-dimensional image of a cell viewed from any direction can be displayed.

A three-dimensional image can also be displayed by converting pixel images into point clouds and arranging the point clouds on three-dimensional coordinates, and then defining the transmittance, reflectance, and direction of each point cloud.

Three-dimensional data can be displayed by, for example, volume rendering, which extracts or segments specific regions such as cytoplasm and a cell nucleus, concatenates them as voxel data, and sets transmittance and reflectance for their surfaces to display an image.

A three-dimensional model composed of polygons can be displayed by extracting just the surface information of the volume rendering data and converting the voxel information to surface polygon information from the vector of the normal direction of the surface and the image information at that position.

In converting or displaying these image data, the image may be deconvoluted to separate data in positions other than the three-dimensional position to be displayed. A region to be displayed or highlighted can be specified to be displayed in a characterized manner. For example, by extracting and highlighting information on a nucleus, regions important for cytological diagnosis, such as the shape of the nucleus, the nucleolus and chromatin inside the nucleus, can be highlighted for easier assessment. In addition, by analyzing the shape, physical measurements can be displayed together.

EXAMPLE

Figure 13:
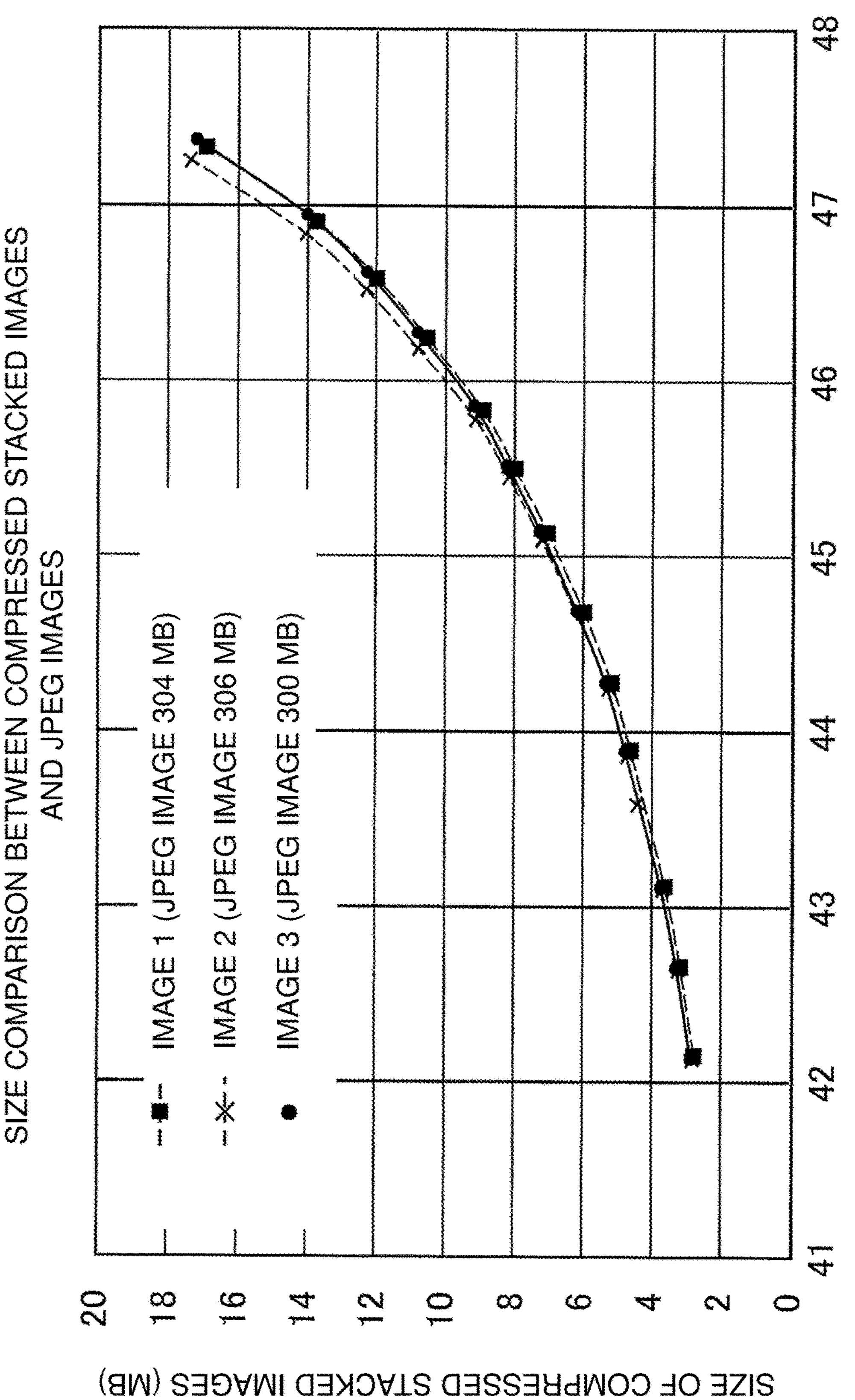
FIG. 13 is a graph showing the size of stacked images after compression in Example.

FIG. 13 shows a comparison between the case where images of layers are stored as conventional still images and the case where they are compressed and stored as stacked images. Using a 30-layer images of 5472×3468 pixels, the data size of the stacked images when stored as JPEG images (quality 100) and when compressed and stored as stacked images and the peak signal-to-noise ratio PSNR of the stacked compressed images to the JPEG images were examined. Images 1 to 3 are JPEG images respectively having data sizes of 304 MB, 306 MB, and 300 MB. The size of the stacked images after compression is variable depending on the required image quality or image size by parameters used in the compression. As a result, the image size was largely reduced to 1/16to 1/100 of the total JPEG image size, while maintaining a PSNR of at least 40, which is generally difficult to distinguish from the JPEG images.

REFERENCE SIGNS LIST

10 stage
20 microscope
22 illumination
30 imaging unit (camera)
40 focal plane moving mechanism
42 stage moving mechanism
50 control unit
55 image buffer
60 compression unit
70 recording unit
80 transmission unit
S specimen

The invention claimed is:

1. A microscope system comprising:

a microscope configured to acquire an image of a specimen on a focal plane;

an imaging unit configured to image the image acquired by the microscope;

a focal plane moving mechanism configured to move the focal plane in an optical axis direction of the microscope;

a compression unit configured to compress image data pieces of a plurality of the images acquired by the imaging unit to generate compressed image data; and a control unit configured to transmit, to the focal plane moving mechanism, a focal plane control signal to move the focal plane to a predetermined focal coordinate, transmit, to the imaging unit, a plurality of imaging timing signals specifying timing of imaging a plurality of the images in a single spot, and transmit, to the compression unit, layer count data indicating the number of the plurality of imaging timing signals in the single spot, wherein the compression unit executes an error process when the compression unit has not received the image data pieces as many as an imaging count based on the layer count data within a predetermined time in the single spot without generating the compressed image data, and the compression unit generates the compressed image data when the compression unit has received the image data pieces as many as the imaging count based on the layer count data within the predetermined time in the single spot.

2. The microscope system according to claim 1, further comprising:

a stage on which the specimen is placed; and a stage moving mechanism configured to relatively move the microscope and the stage in a perpendicular direction to the optical axis direction, wherein the control unit transmits, to the stage moving mechanism, a stage-movement control signal to relatively move the microscope and the stage in the perpendicular direction to the optical axis direction.

3. The microscope system according to claim 1, further comprising a storage unit configured to store the compressed image data generated by the compression unit.

4. The microscope system according to claim 2, wherein the control unit transmits, to the imaging unit, the imaging timing signal at a timing when the focal coordinate attains a predetermined coordinate based on the focal plane control signal and the stage-movement control signal.

5. The microscope system according to claim 3, wherein the storage unit records imaging position data with the compressed image data.

6. A data processing method comprising:

forming, in an imaging unit by a microscope, an image of a specimen on a focal plane;

moving the focal plane to a predetermined focal coordinate along an optical axis direction of the microscope;

imaging the image by the imaging unit based on an imaging timing signal in a single spot;

transmitting, to a compression unit, layer count data indicating the number of the imaging timing signal in the single spot;

compressing, by the compression unit, image data pieces of the images imaged by the imaging unit to generate compressed image data when the compression unit has received the image data pieces as many as an imaging count based on the layer count data within a predetermined time in the single spot; and executing an error process by the compression unit when the compression unit has not received the image data pieces as many as the number based on the layer count data within the predetermined time in the single spot without generating the compressed image data.

7. The data processing method according to claim 6, further comprising relatively moving a stage on which the specimen is placed and the microscope based on a stage-movement control signal in a perpendicular direction to the optical axis direction.

8. The data processing method according to claim 6, further comprising storing the compressed image data.

9. The data processing method according to claim 6, further comprising transmitting the imaging timing signal to the imaging unit at a timing when the focal coordinate attains a predetermined coordinate.

10. The microscope system according to claim 2, further comprising a storage unit configured to store the compressed image data generated by the compression unit.

11. The data processing method according to claim 7, further comprising storing the compressed image data.

12. The data processing method according to claim 7, further comprising transmitting the imaging timing signal to the imaging unit at a timing when the focal coordinate attains a predetermined coordinate.

13. The microscope system according to claim 1, wherein the error process includes capturing images in the same single spot or performing a timeout process.

14. The data processing method according to claim 6, wherein the error process includes capturing images in the same single spot or performing a timeout process.

* * * * *